United States Patent

Khan et al.

[11] Patent Number: 5,940,246
[45] Date of Patent: Aug. 17, 1999

[54] DISC DRIVE HYDRO BEARING LUBRICANT WITH ELECTRICALLY CONDUCTIVE, NON-METALLIC ADDITIVE

[75] Inventors: Raquib U. Khan, Pleasanton; Samnathan Murthy, Santa Cruz; Norbert S. Parsoneault, Watsonville; Hans L. Leuthold, Santa Cruz, all of Calif.

[73] Assignee: Seagate Technolog, Inc., Scotts Valley, Calif.

[21] Appl. No.: 08/737,162
[22] PCT Filed: Nov. 14, 1996
[86] PCT No.: PCT/US96/18366
 § 371 Date: Nov. 14, 1996
 § 102(e) Date: Nov. 14, 1996
[87] PCT Pub. No.: WO97/18562
 PCT Pub. Date: May 22, 1997

Related U.S. Application Data

[60] Provisional application No. 60/006,842, Nov. 16, 1995.
[51] Int. Cl.[6] .................................................. G11B 17/02
[52] U.S. Cl. ............................................................. 360/99.08
[58] Field of Search ........................... 360/99.08, 98.07, 360/97.02; 384/446, 473, 478

[56] References Cited

U.S. PATENT DOCUMENTS

| | | | |
|---|---|---|---|
| 3,585,422 | 6/1971 | Burnier | 310/11 |
| 4,628,384 | 12/1986 | Raj et al. | 360/97 |
| 4,673,997 | 6/1987 | Gowda et al. | 360/107 |
| 4,692,826 | 9/1987 | Raj et al. | 360/97 |
| 4,772,032 | 9/1988 | Raj et al. | 277/80 |
| 4,824,122 | 4/1989 | Raj et al. | 277/80 |
| 5,057,952 | 10/1991 | Takahashi | 360/97.02 |
| 5,155,640 | 10/1992 | Lee | 360/98.07 |
| 5,210,665 | 5/1993 | Nishizawa | 360/99.08 |
| 5,367,416 | 11/1994 | Cossette et al. | 360/97.02 |

*Primary Examiner*—Allen T. Cao
*Attorney, Agent, or Firm*—Westman, Champlin & Kelly, P.A.

[57] ABSTRACT

A disc drive data storage system according to the present invention includes a stationary member, a rotatable member and a hydro bearing which interconnects the stationary member and the rotatable member. At least one data storage disc is attached to and is coaxial with the rotatable member. The hydro bearing includes an electrically non-conductive lubricant and an electrically conductive, non-metallic additive.

20 Claims, 4 Drawing Sheets

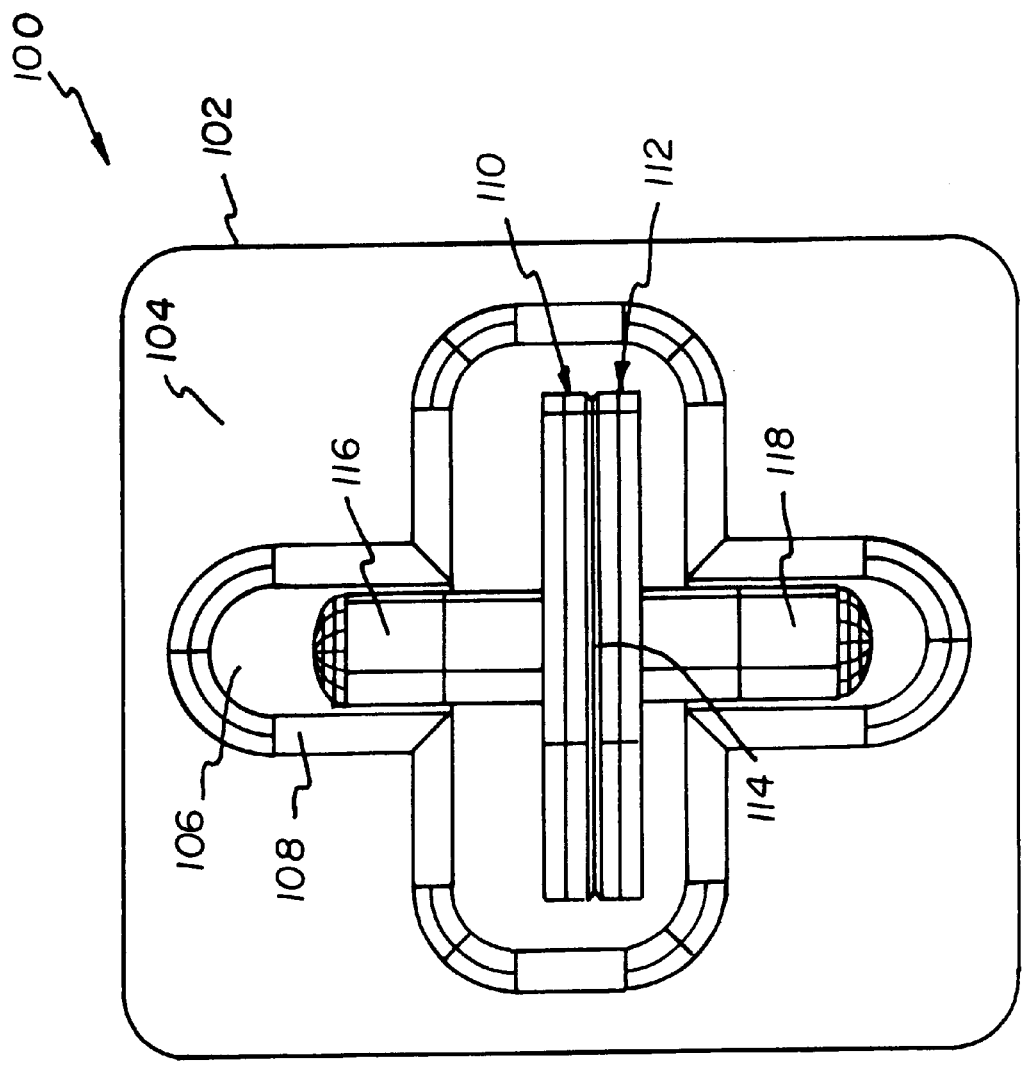

DISC DRIVE HYDRO BEARING LUBRICANT WITH ELECTRICALLY CONDUCTIVE, NON-METALLIC ADDITIVE

This application claims the benefit of U.S. provisional application No. 60/006,842 filed Nov. 16, 1995.

BACKGROUND OF THE INVENTION

The present invention relates to the field of hydrodynamic bearing spindle motors for disc drive data storage devices and, more particularly, to a motor having a lubricant with an electrically conductive, nonmetallic additive.

Disc drive data storage devices, known as "Winchester" type disc drives, are well-known in the industry. In a Winchester disc drive, digital data is written to and read from a thin layer of magnetizable material on the surface of rotating discs. Write and read operations are performed through a transducer which is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. The rotational speed of the spindle motor is precisely controlled by motor drive circuitry which controls both the timing and the power of commutation signals directed to the stator windings of the motor. Typical spindle motor speeds have been in the range of 3600 RPM. Current technology has increased spindle motor speeds to 7200 RPM, 10,000 RPM and above.

One of the principal sources of noise in disc drive data storage devices is the spindle motor. Disc drive manufacturers have recently begun looking at replacing conventional ball or roller bearings in spindle motors with "hydro" bearings, such as hydrodynamic or hydrostatic bearings. A hydro bearing relies on a fluid film which separates the bearing surfaces and is therefore much quieter and in general has lower vibrations than conventional ball bearings. A hydrodynamic bearing is a self-pumping bearing which generates a pressure internally to maintain the fluid film separation. A hydrostatic bearing requires an external pressurized fluid source to maintain the fluid separation. Relative motion between the bearing surfaces in a hydro bearing causes a shear element which occurs entirely within the fluid film such that no contact between the bearing surfaces occurs.

In a hydro bearing, a lubricating fluid such as air or liquid, provides a bearing surface between a stationary member of the housing and a rotating member of the disc hub. In addition to air, typical lubricants include oil or ferromagnetic fluids. Hydro bearings spread the bearing surface over a large surface area in comparison with a ball bearing assembly which comprises a series of point interfaces. This is desirable because the increased bearing surface decreases wobble or run-out between the rotating and fixed members.

However, a typical hydro bearing lubricant is electrically non-conducting. During operation, electrostatic charge may build up on the disc surface. Without an electrical path from the disc surface to the disc drive housing assembly, the electrostatic charge may discharge through the read/write heads. This can cause loss of data or damage to the heads themselves, particularly in magnetoresistive (MR) heads which are very susceptible to damage by electrostatic discharge. Conductive lubricants have been used to provide an alternative conducting path. Conventional conductive lubricants, such as ferrofluids, use metallic or magnetic particles in suspension to provide electrical conductivity. These fluids usually have very high viscosity and have poor anti-wear performance.

Viscosity and anti-wear performance are important considerations in miniature hydra bearings for disc drives. The lubrication properties that must be controlled and the degree of control that must be obtained are unique to these bearings. In addition to viscosity and anti-wear, other important properties include power dissipation, migration, vapor pressure and evaporation rate, resistance to oxidation and corrosion, rheology, boundary properties and system compatibility. Viscosity determines power dissipation and bearing stiffness, which should be relatively constant over various operating conditions. Miniature disc drive applications require small power dissipation and a limited oil supply that must be adequate for a long life without escaping from the bearing. The lubricant should have low migration so the lubricant does not creep out of the bearing and into the head-disc interface. The lubricant should have a high resistance to oxidation and reactivity to provide a long life for the bearing. Rheology is the deformation and flow response to shear.

The lubricant should also be compatible with the other materials of the disc drive. For example, migration or outgassing of the lubricant should not impair the interface between the head and the disc, such as by causing an increase in the sticking friction between the head and the disc or a degradation of the head structure or operation. Formulation of fluids for appropriate hydro bearing properties therefore requires different considerations than for fluids intended as general purpose lubricants.

SUMMARY OF THE INVENTION

The present invention is a disc drive spindle motor having a hydrodynamic bearing comprising an electrically non-conductive lubricant and an electrically conductive, non-metallic additive. In one embodiment, the lubricant includes a mineral based hydrocarbon, a synthetic hydrocarbon or an ester which is treated with an organic polymer additive. The additive preferably has a low concentration in the lubricant, which can be adjusted to provide a desired conductivity. A low concentration minimizes changes to the overall viscosity of the lubricant.

BRIEF DESCRIPTION OF THE DRAWINGS

FIG. 4 is a top plan view of a test fixture which was used to test additives according to the present invention.

DETAILED DESCRIPTION OF THE PREFERRED EMBODIMENTS

Figure 1:
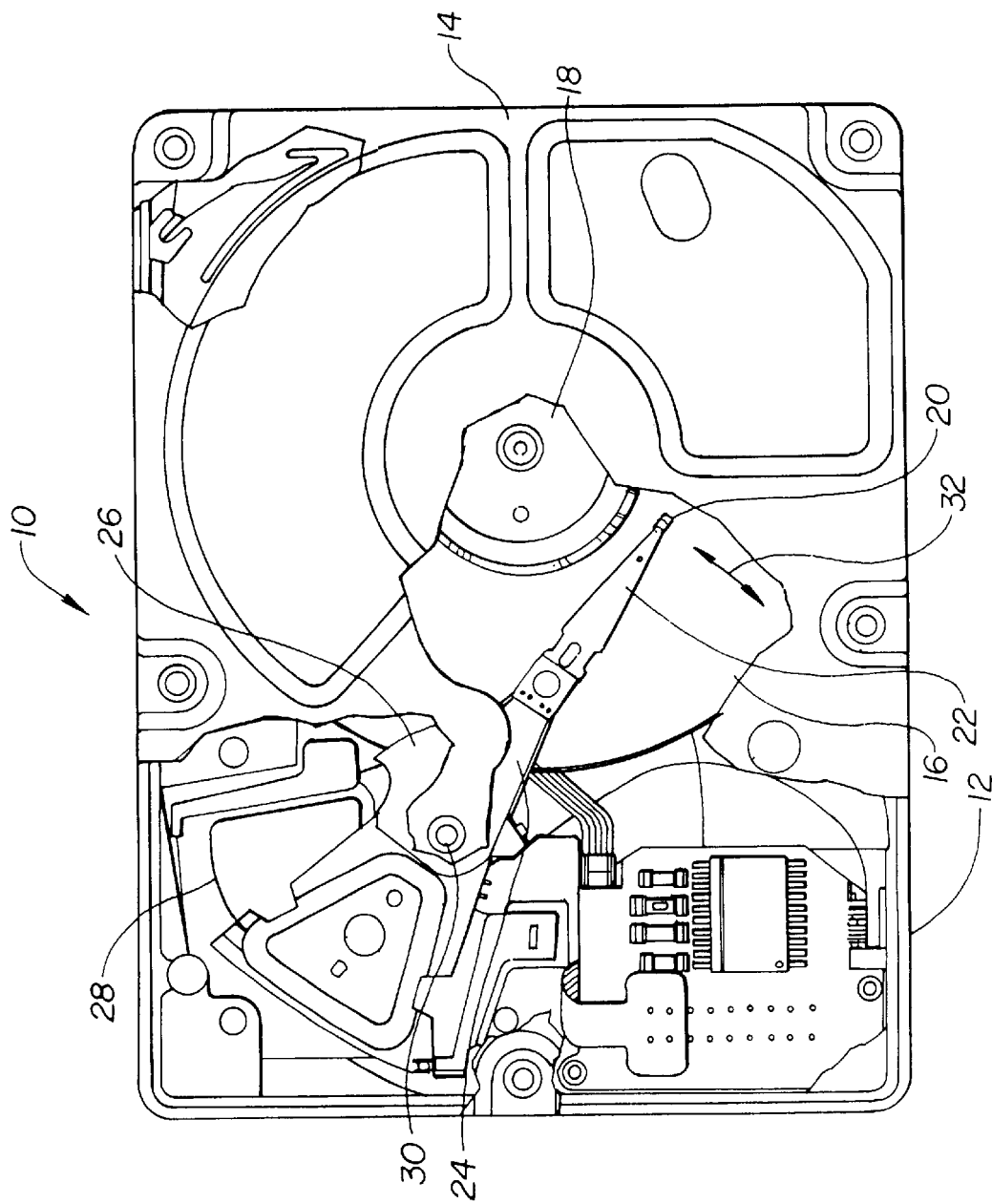
FIG. 1 is a top plan view of a disc drive data storage device, in accordance with the present invention.

The present invention is a disc drive spindle motor having a hydro bearing fluid comprising a conventional non-conducting lubricant and an electrically conductive, non-metallic additive. FIG. 1 is a top plan view of a typical disc drive 10 in which the present invention is useful. Disc drive 10 includes a housing base 12 and a top cover 14. The housing base 12 is combined with top cover 14 to form a sealed environment to protect the internal components from contamination by elements from outside the sealed environment.

Disc drive 10 further includes a disc pack 16 which is mounted for rotation on a spindle motor (not shown) by a disc clamp 18. Disc pack 16 includes a plurality of individual discs which are mounted for co-rotation about a central axis. Each disc surface has an associated head 20 which is mounted to disc drive 10 for communicating with the disc surface. In the example shown in FIG. 1, heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the present invention is also useful in disc drives having other types of actuators, such as linear actuators.

Figure 2:
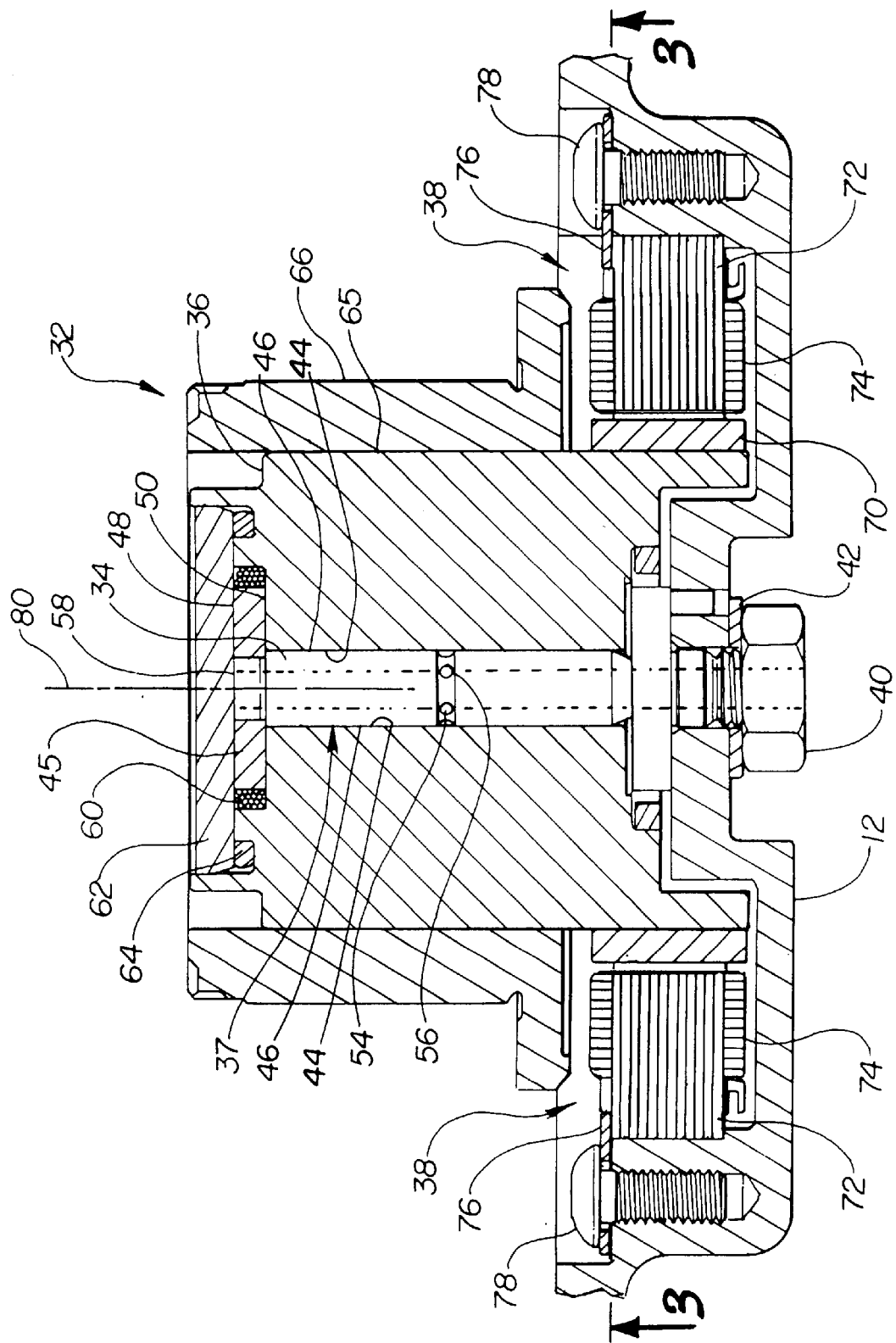
FIG. 2 is a sectional view of a hydrodynamic bearing spindle motor in accordance with the present invention.

FIG. 2 is a sectional view of a hydrodynamic bearing spindle motor 32 in accordance with the present invention. Spindle motor 32 includes a stationary member 34, a hub 36 and a stator 38. In the embodiment shown in FIG. 2, the stationary member is a shaft which is fixed and attached to base 12 through a nut 40 and a washer 42. Hub 36 is interconnected with shaft 34 through a hydrodynamic bearing 37 for rotation about shaft 34. Bearing 37 includes radial working surfaces 44 and 46 and axial working surfaces 48 and 50. Shaft 34 includes fluid ports 54, 56 and 58 which supply lubricating fluid 60 and assist in circulating the fluid along the working surfaces of the bearing. Lubricating fluid 60 is supplied to shaft 34 by a fluid source (not shown) which is coupled to the interior of shaft 34 in a known manner.

Spindle motor 32 further includes a thrust bearing 45 which forms the axial working surfaces 48 and 50 of hydrodynamic bearing 37. A counterplate 62 bears against working surface 48 to provide axial stability for the hydrodynamic bearing and to position hub 36 within spindle motor 32. An O-ring 64 is provided between counterplate 62 and hub 36 to seal the hydrodynamic bearing. The seal prevents hydrodynamic fluid 60 from escaping between counterplate 62 and hub 36. In an alternative embodiment, O-ring 64 is replaced with a ferrofluid seal in a known manner. The ferrofluid is held in place between hub 36 and shaft 34 with one or more magnets positioned about hub 36 or shaft 34.

Hub 36 includes a central core 65 and a disc carrier member 66 which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for spindle motor 32. Core 65 is formed of a magnetic material and acts as a back-iron for magnet 70. Rotor magnet 70 can be formed as a unitary, annular ring or can be formed of a plurality of individual magnets which are spaced about the periphery of hub 36. Rotor magnet 70 is magnetized to form one or more magnetic poles.

Stator 38 is attached to base 12 and includes stator laminations 72 and a stator windings 74. Stator windings 74 are attached to laminations 72. Stator windings 74 is spaced radially from rotor magnet 70 to allow rotor magnet 70 and hub 36 to rotate about a central axis 80. Stator 38 is attached to base 12 through a known method such as one or more C-clamps 76 which are secured to the base through bolts 78.

Commutation pulses applied to stator windings 74 generate a rotating magnetic field which communicates with rotor magnet 70 and causes hub 36 to rotate about central axis 80 on bearing 37. The commutation pulses are timed, polarization-selected DC current pulses which are directed to sequentially selected stator windings to drive the rotor magnet and control its speed.

In the embodiment shown in FIG. 2, spindle motor 32 is a "below-hub" type motor in which stator 38 has an axial position that is below hub 36. Stator 38 also has a radial position that is external to hub 36, such that stator windings 74 are secured to an inner diameter surface 82 of laminations 72. In an alternative embodiment, the stator is positioned within the hub, as opposed to below the hub. The stator can have a radial position which is either internal to the hub or external to the hub. In addition, the spindle motor of can have a fixed shaft, as shown in FIG. 2 or a rotating shaft. In a rotating shaft spindle motor, the bearing is located between the rotating shaft and an outer stationary sleeve which is coaxial with the rotating shaft.

Figure 3:
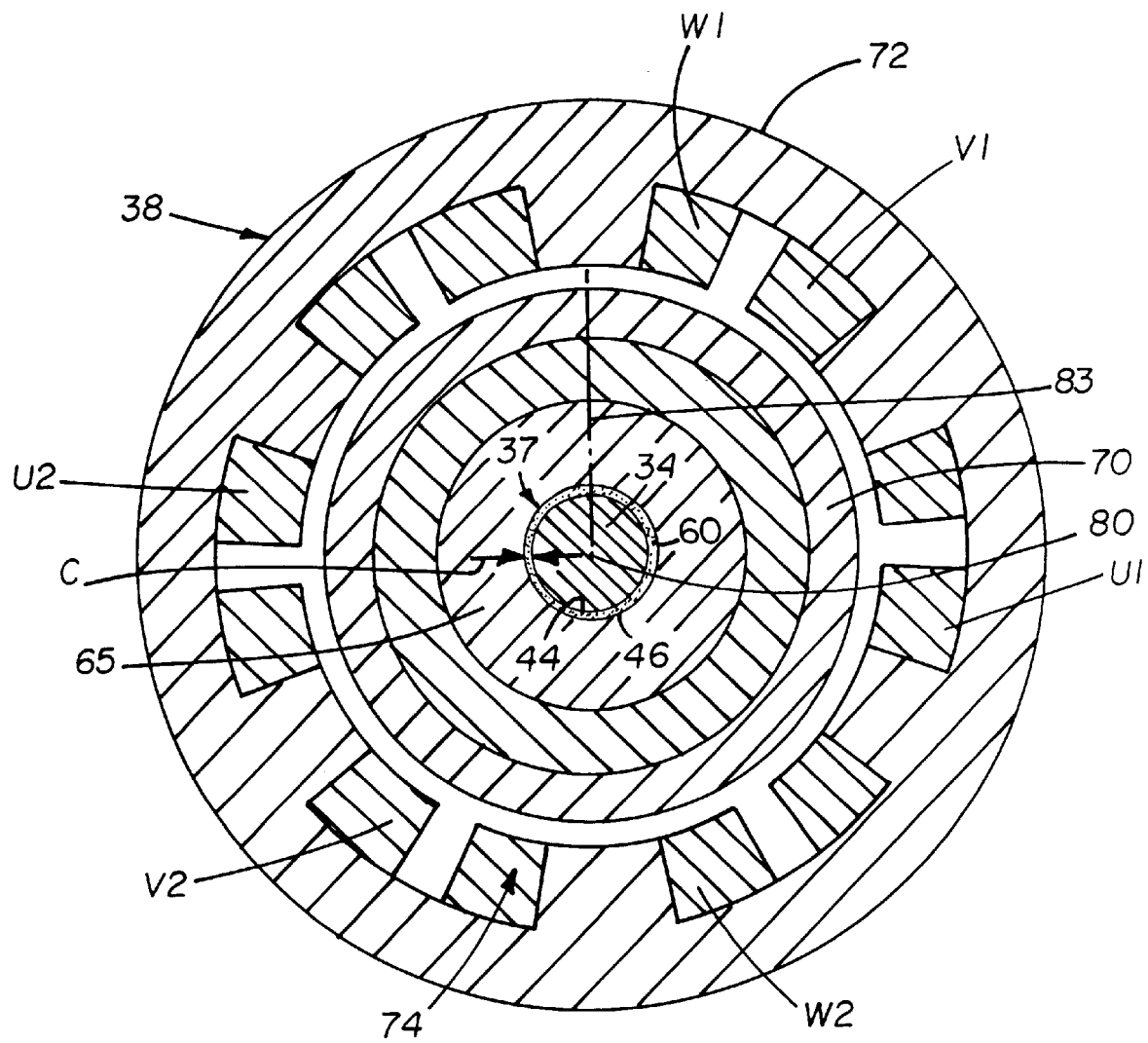
FIG. 3 is a diagrammatic sectional view of the hydrodynamic spindle motor taken along line 3—3 of FIG. 2, with portions removed for clarity.

FIG. 3 is a diagrammatic sectional view of hydrodynamic spindle motor 32 taken along line 3—3 of FIG. 2, with portions removed for clarity. Stator 38 includes laminations 72 and stator windings 74, which are coaxial with rotor magnet 70 and central core 65. Stator windings 74 include phase windings W1, V1, U1, W2, V2 and U2 which are wound around teeth in laminations 72. The phase windings are formed of coils which have a coil axis that is normal to and intersects central axis 80. For example, phase winding W1 has a coil axis 83 which is normal to central axis 80. Radial working surfaces 44 and 46 of hydrodynamic bearing 37 are formed by the outer diameter surface of shaft 34 and the inner diameter surface of central core 65. Radial working surfaces 44 and 46 are separated by lubrication fluid 60, which maintains a clearance c during normal operation.

According to the present invention, hydro bearing fluid 60 comprises an electrically non-conductive lubricant and an electrically conductive, non-metallic, non-magnetic additive which improves electrical conductivity of the lubricant without sacrificing desirable lubricating properties such as viscosity, anti-oxidation, anti-corrosion and anti-wear performance. Preferred base lubricants include a mineral based hydrocarbon, a synthetic hydrocarbon, an ester or a combination of base lubricants. Mineral based hydrocarbons are preferably highly refined (highly purified).

Preferred additives include organic polymers, such as a commercially available solution of a quarternized polymeric aminoamide ester, a nitrilo polymer, chlorobenzene and ethylene dichloride in aromatic and aliphatic hydrocarbons. The aromatic and aliphatic hydrocarbons have a 40–70% concentration as compared to the remaining elements of the additive solution. One example of such a commercially available solution is Tolad 511 from Petrolite Corporation, U.S.A. Another example of a suitable commercially available organic polymer includes a solution of a solvent (tolune, isopropyl alcohol, and other aromatic solvents C9-C16), dodecyl, benzene and sulfonic acid. Other commercially available solutions can also be used. Since the additives are non-metallic and non-magnetic, the additives do not adversely effect wear and viscosity performance. Other non-metallic additive solutions can also be used.

The concentration of the additive in the lubricant can be varied to achieve a desired conductivity. However, the concentration is preferably kept low such that the overall viscosity of the lubricant is not changed. In a preferred embodiment, the concentration of the additive is 100–5000 ppm in the lubricant, and the treated lubricant has a resistance of less than 50 MΩ. For example, 1000 ppm (i.e. 0.1%) of an organic polymer in a mineral based hydrocarbon has been found to give suitable performance. This is a much lower concentration than a typical ferrofluid lubricant in which the ferromagnetic particles have a concentration in the lubricant of up to 4%.

EXAMPLES

FIG. 3 is a top plan view of a test fixture which was used to test a lubricant according to the present invention. Test fixture 100 includes an oil bath 102 having a planar surface 104 and a recessed area 106 with side walls 108. Test fixture 100 further includes a pair of spaced apart metal plates 110 and 112. Plates 110 and 112 are circular discs having a diameter of one inch and a fine surface finish. Plates 110 and 112 are spaced apart by a plastic shim 114 having a diameter of ¼ inch. Electrical terminals 116 and 118 are electrically coupled to plates 110 and 112, respectively. Recessed area 106 has a depth which is sufficient to submerge plates 110 and 112 when the recessed area is filled with the lubricant under test.

First, an untreated mineral based hydrocarbon lubricant (Sample 1 in Table 1) was introduced between the plates and the resistance and dissipation were measured through electrical terminals 116 and 118. Dissipation is a ratio of a real impedance over an imaginary impedance. Dissipation is a term used to measure the "quality" of a capacitor. It is the rate at which the charge across the plates of the capacitor bleeds through the dielectric medium. Since the untreated lubricant in the test fixture is essentially non-conducting, the test fixture acts like a parallel plate capacitor. A capacitor has infinite resistance and infinitesimal dissipation. The measured resistance and dissipation are shown in the top row of Table 1:

TABLE 1

| | Concentration (ppm) | Dissipation (Ratio) | Resistance (MΩ) |
|---|---|---|---|
| Sample 1 (Untreated hydrocarbon) | | 0.0002 | beyond range |
| Sample 2 | 1006 | 0.1868 | 5.92 |
| Sample 3 | 500 | 0.0437 | 24.3 |
| Sample 4 | 1000 | 0.0803 | 7.5 |
| Sample 5 | 1000 | 0.1480 | 3.8 |

Next, solutions of base fluids and nonmetallic, electrically conductive additives were prepared and introduced between plates 112 and 114. In Sample 2, a mineral based hydrocarbon base fluid was blended with an additive comprising a commercially available solution of a polymeric aminoamide ester, a nitrilo polymer, chlorobenzene and ethylene dichloride in aromatic and aliphatic hydrocarbons. The additive had a concentration of 1000 ppm in the fluid. Again, the resulting resistance and dissipation were measured. When the lubricant was treated with the additive, the lubricant conducted a charge. As shown in Table 1, the dissipation increased and the resistance decreased. Sample 2 had a viscosity of 15 centistokes (cst) at zero degrees Celsius and a specific gravity of 0.88 at 16 degrees Celsius. Thus, the additive increased the conductivity of the lubricant while maintaining a desirable viscosity.

In Samples 3 and 4, an ester base fluid was treated with the additive that was used in Sample 2, at two different concentrations. These samples were also found to be successful. The lubricant had a relatively high dissipation and a relatively low resistance at both concentrations.

Finally, in Sample 5, an ester based base fluid was blended with a commercially available additive comprising a non-metallic polymer in a tolune solvent. The major ingredients of the additive included, among others, the solvent (tolune, isopropyl alcohol, and other aromatic solvents C9-C16), dodecyl, benzene and sulfonic acid. In this case, the dissipation factor was higher and the resistance was much less. Therefore, a very low concentration of about 100 ppm (0.01%) would also have conductivity in the fluid. Sample 5 had a viscosity of 10 centistokes (cst) at zero degrees Celsius and a specific gravity of 0.91 at 16 degrees Celsius.

The hydro bearing lubricant of the present invention therefore provides an electrically conductive path for discharging electrostatic charge from the disc surface while providing greatly improved wear performance over conductive lubricants that include metallic or magnetic additives.

In alternative embodiments, the lubricant can include numerous other blends or additives for improving performance factors such as oxidation, corrosion, wear and viscosity, as discussed in greater detail in U.S. application Ser. No. 08/737,431, entitled "Disc Drive Spindle Motor Having Hydro Bearing With Optimized Lubricant Viscosity," U.S. application Ser. No. 08/737,438, entitled "Miniature Disc Drive Spindle Motor Having Hydro Bearing With High Shear-Strength Viscosity Index Improved Lubricant," and U.S. application Ser. No. 08/737,439, entitled "Disc Drive Spindle Motor Having Hydro Bearing With Lubricant Optimized With Disc Drive Compatible Additives," which were filed on Oct. 25, 1996, claim priority from U.S. Provisional application Ser. No. 60/008,124 and are hereby incorporated by reference.

Although the present invention has been described with reference to preferred embodiments, workers skilled in the art will recognize that changes may be made in form and detail without departing from the spirit and scope of the invention. The specific lubricants and additives provided herein are examples only. Other base lubricants and non-metallic or nonmagnetic conductivity enhancing additives can also be used in accordance with the present invention.

What is claimed is:

1. A disc drive data storage system, comprising:

a housing;

a central axis;

a stationary member which is fixed with respect to the housing and coaxial with the central axis;

a stator which is fixed with respect to the housing;

a rotatable member which is rotatable about the central axis with respect to the stationary member;

a rotor supported by the rotatable member and magnetically coupled to the stator;

at least one data storage disc attached to and coaxial with the rotatable member; and a hydro bearing interconnecting the stationary member and the rotatable member and comprising an electrically conductive lubricant in liquid solution form, the electrically conductive lubricant comprising an electrically non-conductive base fluid and an electrically conductive, non-metallic additive.

2. The disc drive data storage system of claim 1 wherein the electrically non-conductive base fluid comprises a mineral based hydrocarbon.

3. The disc drive data storage system of claim 1 wherein the electrically non-conductive base fluid comprises a synthetic hydrocarbon.

4. The disc drive data storage system of claim 1 wherein the electrically non-conductive base fluid comprises an ester.

5. The disc drive data storage system of claim 1 wherein the electrically conductive, non-metallic additive is non-magnetic.

6. The disc drive data storage system of claim 1 wherein the electrically conductive, non-metallic additive comprises an organic polymer.

7. The disc drive data storage system of claim 1 wherein the electrically conductive, non-metallic additive has a concentration in the lubricant of 100–5000 ppm.

8. A hydro bearing disc drive lubrication fluid for lubricating a hydro bearing in a disc drive, the fluid comprising:
   a base fluid which is electrically non-conductive; and
   an electrically conductive, non-metallic additive, wherein the hydro bearing disc drive lubrication fluid is in a liquid solution form.

9. The hydro bearing disc drive lubrication fluid of claim 8 wherein the base fluid comprises a mineral based hydrocarbon.

10. The hydro bearing disc drive lubrication fluid of claim 8 wherein the base fluid comprises an ester.

11. The hydra bearing disc drive lubrication fluid of claim 8 wherein the electrically conductive, non-metallic additive is non-magnetic.

12. The hydro bearing disc drive lubrication fluid of claim 8 wherein the electrically conductive, non-metallic additive comprises an organic polymer.

13. The hydro bearing disc drive lubrication fluid of claim 8 wherein the electrically conductive, non-metallic additive has a concentration in the base fluid of 100–5000 ppm.

14. A disc drive data storage system, comprising:
   a housing;
   a central axis;
   a stationary member which is fixed with respect to the housing and coaxial with the central axis;
   a stator which is fixed with respect to the housing;
   a rotatable member which is rotatable about the central axis with respect to the stationary member;
   a rotor supported by the rotatable member and magnetically coupled to the stator;
   at least one data storage disc attached to and coaxial with the rotatable member; and
   a hydro bearing interconnecting the stationary member and the rotatable member and comprising an electrically conductive lubricant in liquid solution form, the electrically conductive lubricant comprising an electrically non-conductive base fluid and an electrically conductive organic polymer additive which is non-metallic and non-magnetic and has a concentration in the lubricant of 100–5000 ppm.

15. The disc drive data storage system of claim 14 wherein:
   the base fluid comprises a mineral based hydrocarbon; and
   the organic polymer additive comprises a polymeric aminoamide ester, a nitrilo polymer, chlorobenzene and ethylene dichloride in aromatic and aliphatic hydrocarbons.

16. The disc drive data storage system of claim 15 wherein the additive has a concentration in the base fluid of 1000 ppm.

17. The disc drive data storage system of claim 14 wherein:
   the base fluid comprises an ester; and
   the organic polymer additive comprises a polymeric aminoamide ester, a nitrilo polymer, chlorobenzene and ethylene dichloride in aromatic and aliphatic hydrocarbons.

18. The disc drive data storage system of claim 17 wherein the additive has a concentration in the base fluid of 500–1000 ppm.

19. The disc drive data storage system of claim 14 wherein:
   the base fluid comprises an ester; and
   the organic polymer additive comprises a polymer in a tolune solvent, dodecyl benzene and sulfonic acid.

20. The disc drive data storage system of claim 19 wherein the additive has a concentration in the base fluid of 100–1000 ppm.

* * * * *

UNITED STATES PATENT AND TRADEMARK OFFICE
CERTIFICATE OF CORRECTION

PATENT NO. : 5,940,246
DATED : August 17, 1999
INVENTOR(S) : Raquib U. Khan et al.

It is certified that error appears in the above-identified patent and that said Letters Patent is hereby corrected as shown below:

Col. 7, line 29, delete "hydra" and insert --hydro--.

Signed and Sealed this

Sixteenth Day of May, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 5,940,246
DATED : August 17, 1999
INVENTOR(S) : Raquib U. Khan et al.

It is certified that error appears in the above-identified patent and that said Letters Patent is hereby corrected as shown below:

Title page,
Item [56], OTHER PUBLICATIONS,
-- Petrolite Corporation Product Information "TOLAD® 511 Electrical Conductivity Additive," undated.

Petrolite Corporation Product Information "Material Safety Data Sheet," for TOLAD® 511, 9/12/93.

Dupont Product Information, Stadis 450 Petroleum Additives, "Stadis® 450 Antistatic Additive," undated.

Octel America Product Information, Material Safety Data Sheet, "Stadis 450 Conductivity Improver," 8/28/95. --

Signed and Sealed this

Nineteenth Day of February, 2002

Attest:

Attesting Officer

JAMES E. ROGAN
Director of the United States Patent and Trademark Office